(12) United States Patent
Tho

(10) Patent No.: US 9,244,534 B2
(45) Date of Patent: Jan. 26, 2016

(54) MOBILE TERMINAL

(75) Inventor: Gihoon Tho, Seoul (KR)

(73) Assignee: LG ELECTRONICS INC., Seoul (KR)

(*) Notice: Subject to any disclaimer, the term of this patent is extended or adjusted under 35 U.S.C. 154(b) by 853 days.

(21) Appl. No.: 12/827,900

(22) Filed: Jun. 30, 2010

(65) Prior Publication Data

US 2011/0050583 A1    Mar. 3, 2011

(30) Foreign Application Priority Data

Aug. 27, 2009  (KR) .......................... 10-2009-0079962

(51) Int. Cl.
  G06F 3/02      (2006.01)
  G06F 1/16      (2006.01)
  H04M 1/22      (2006.01)
  G06F 3/0489    (2013.01)

(52) U.S. Cl.
  CPC ............ *G06F 3/0202* (2013.01); *G06F 1/1624* (2013.01); *G06F 1/1662* (2013.01); *G06F 3/0489* (2013.01); *H04M 1/22* (2013.01)

(58) Field of Classification Search
  CPC ... G06F 1/1624; G06F 1/1626; G06F 1/1632; G06F 1/1662; G06F 1/1684; G06F 3/041; G09F 3/204; G09F 9/30
  USPC ............. 345/173; 455/575.1, 566; 340/407.2; 178/18.06; 200/310
  See application file for complete search history.

(56) References Cited

U.S. PATENT DOCUMENTS

| | | | |
|---|---|---|---|
| 7,098,414 B2* | 8/2006 | Caldwell ........................ | 200/310 |
| 8,576,179 B2* | 11/2013 | Walliser ................... | G06F 3/044 |
| | | | 345/173 |
| 2004/0004602 A1* | 1/2004 | Cheng ................... | G06F 3/0202 |
| | | | 345/169 |
| 2004/0041791 A1 | 3/2004 | Dunker ......................... | 345/168 |
| 2004/0238726 A1 | 12/2004 | Caldwell ....................... | 250/221 |
| 2005/0176471 A1* | 8/2005 | Masuda et al. ................ | 455/566 |
| 2005/0204899 A1 | 9/2005 | Cheng et al. .................... | 84/464 |
| 2008/0094373 A1 | 4/2008 | Song ............................. | 345/173 |
| 2008/0207254 A1 | 8/2008 | Pierce et al. ............... | 455/550.1 |
| 2008/0246742 A1 | 10/2008 | Wang et al. ................... | 345/173 |
| 2008/0311963 A1* | 12/2008 | Strawn ....................... | 455/575.1 |

(Continued)

FOREIGN PATENT DOCUMENTS

EP    1 722 292 A2    11/2006
EP    1 841 185 A2    10/2007

(Continued)

OTHER PUBLICATIONS

European Search Report issued in related Application No. 10006803.0 dated Aug. 5, 2014.

(Continued)

*Primary Examiner* — Quan-Zhen Wang
*Assistant Examiner* — Yuk Chow
(74) *Attorney, Agent, or Firm* — Ked & Associates, LLP

(57) ABSTRACT

A mobile terminal includes a transparent keypad having a plurality of key regions, a first transparent sheet having first conductive patterns to detect touch inputs on respective ones of the key regions, a plurality of luminous elements aligned with the key regions, and a second transparent sheet having second conductive patterns coupled to respective ones of the luminous elements. The first and second conductive patterns are transparent and the second conductive patterns deliver signals to the luminous elements to light the key regions. The keypad may be mounted on a slider for sliding into and out of a main body of the terminal.

11 Claims, 8 Drawing Sheets

(56) References Cited

U.S. PATENT DOCUMENTS

| | | | |
|---|---|---|---|
| 2009/0194344 A1* | 8/2009 | Harley et al. | 178/18.06 |
| 2010/0004027 A1* | 1/2010 | Jang | H04M 1/0237 |
| | | | 455/566 |
| 2010/0052880 A1* | 3/2010 | Laitinen et al. | 340/407.2 |
| 2010/0302192 A1* | 12/2010 | Park et al. | 345/173 |

FOREIGN PATENT DOCUMENTS

| | | |
|---|---|---|
| EP | 2 040 380 A2 | 3/2009 |
| EP | 2 058 729 A1 | 5/2009 |
| JP | 2009-170194 A | 7/2009 |
| KR | 10-2008-00844 93 | 9/2008 |
| WO | WO 2007/148875 A1 | 12/2007 |

OTHER PUBLICATIONS

Partial European Search Report dated May 19, 2014 issued in Application No. 10006803.0.

Korean Office Action dated Oct. 8, 2015 issued in Application No. Oct. 2009-0079962.

\* cited by examiner

MOBILE TERMINAL

CROSS-REFERENCE TO RELATED APPLICATION

Pursuant to 35 U.S.C. §119(a), this application claims benefit of earlier filing date and right of priority to Korean Application No. 10-2009-0079962, filed on Aug. 27, 2009, the contents of which is incorporated by reference herein in its entirety.

BACKGROUND

1. Field

One or more embodiments described herein relate to a mobile terminal.

2. Background

Electronic terminals may be classified into two types: mobile terminals and stationary terminals. Furthermore, mobile terminals can be classified into two types: handheld terminals and vehicle-mounted terminals. The growing trend is to have these terminals become more multifunctional, e.g., capable of capturing still or moving images, playing music or video files, playing games, receiving broadcasts and the like. In spite of this improved functionality, improvements in the appearance of these terminals is still required in order to meet consumer demands.

DETAILED DESCRIPTION

Figure 1:
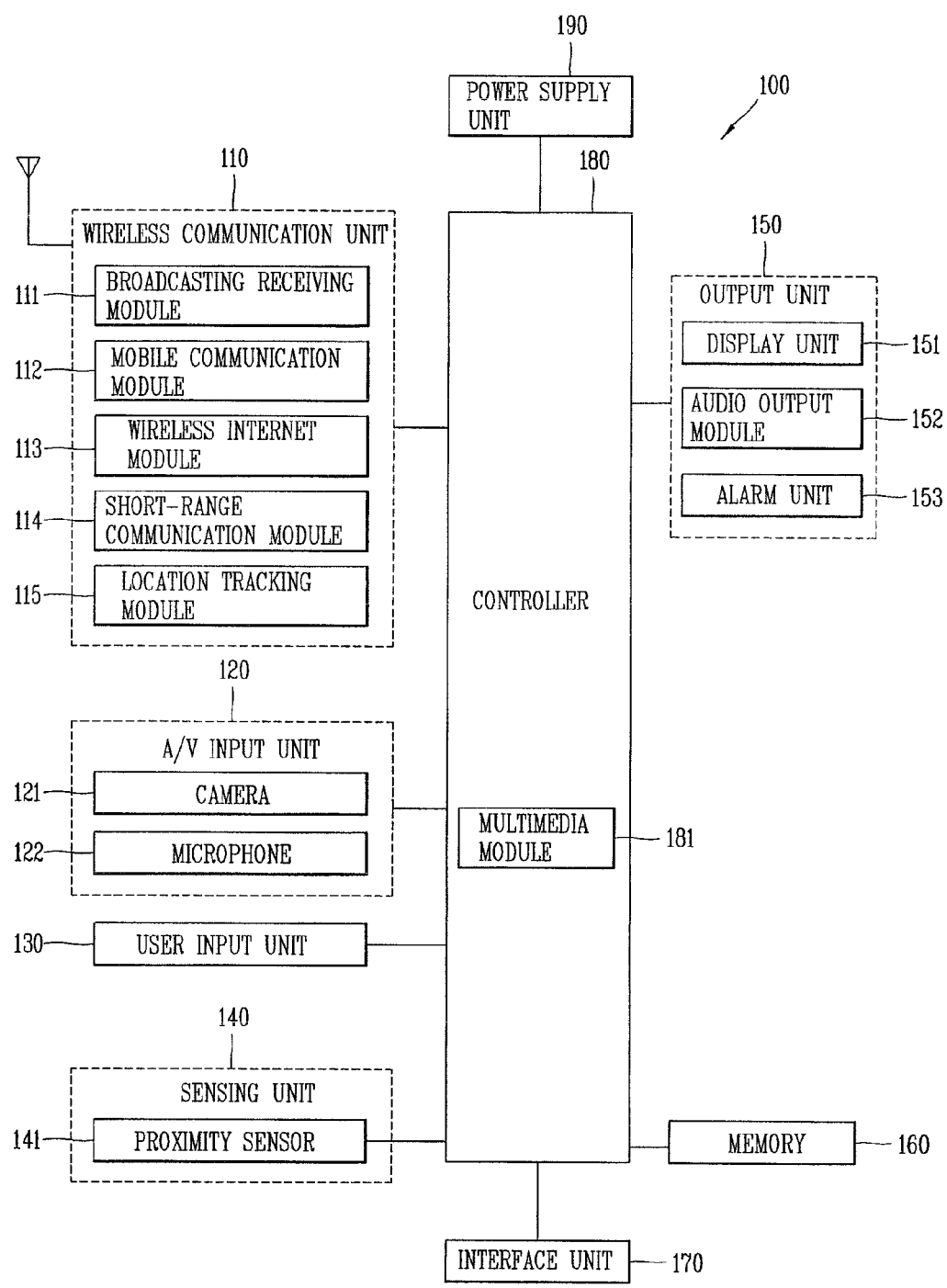
FIG. 1 is a diagram showing a functional block diagram of one embodiment of a mobile terminal.

FIG. 1 is a diagram of one embodiment of a mobile terminal 100 which includes a wireless communication unit 110, an Audio/Video (A/V) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented. Hereinafter, each component is described in sequence.

The wireless communication unit 110 may typically include one or more components which permit wireless communications between the portable terminal 100 and a wireless communication system or between the portable terminal 100 and a network within which the portable terminal 100 is located. For example, the wireless communication unit 110 may include a broadcast receiving module 111, a mobile communication module 112, a wireless Internet module 113, a short-range communication module 114, a position location module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the portable terminal. The broadcast signal may be implemented as a TV broadcast signal, a radio broadcast signal, and a data broadcast signal, among others. The broadcast signal may further include a data broadcast signal combined with a TV or radio broadcast signal.

The broadcast associated information may indicate information relating to broadcast channels, broadcast programs or broadcast service providers. Further, the broadcast associated information may be provided via a mobile communication network and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems.

Broadcast signals and/or broadcast associated information received via broadcast receiving module 111 may be stored in a suitable device, such as a memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the portable terminal. This module may be internally or externally coupled to the portable terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position location module 115 denotes a module for detecting or calculating a position of a portable terminal. An example of the position location module 115 may include a Global Position System (GPS) module.

The A/V input unit 120 is configured to provide audio or video signal input to the mobile terminal. The A/V input unit 120 may include a camera 121 and a microphone 122. The camera 121 receives and processes image frames of still pictures or video obtained by image sensors in a video (telephony) call mode or a capturing mode. The processed image frames may be displayed on a display unit 151.

The image frames processed by camera 121 may be stored in memory 160 or transmitted to the exterior via the wireless communication unit 110. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the orientation of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device and the like. Moreover, the sensing unit 140 may include a proximity sensor 141.

The output unit 150 is configured to output an audio signal, a video signal or an alarm signal. The output unit 150 may include a display unit 151, an audio output module 152, an alarm 153, a haptic module 154 and the like.

The display unit 151 may output information processed in the mobile terminal 100. For example, when the mobile terminal is operating in a phone call mode, the display unit 151 will provide a User Interface (UI) or a Graphic User Interface (GUI) which includes information associated with the call. As another example, if the mobile terminal is in a video call mode or a capturing mode, the display unit 151 may additionally or alternatively display images captured and/or received, UI, or GUI.

The display unit 151 may be implemented using, for example, a Liquid Crystal Display (LCD), Thin Film Transistor-Liquid Crystal Display (TFT-LCD), Organic Light-Emitting Diode (OLED), flexible display, three-dimensional (3D) display, or others.

Some of the displays can be configured to be transparent such that it is possible to see the exterior therethrough. These displays may be called transparent displays. A representative example of the transparent display may include a Transparent Organic Light Emitting Diode (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

Here, if the display unit 151 and a touch sensitive sensor (referred to as a 'touch sensor') have a layered structure therebetween, the structure may be referred to as 'touch screen'. In this structure, the display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

As shown in FIG. 1, a proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm 153 outputs signals notifying occurrence of events from the mobile terminal 100. The events occurring from the mobile terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180. The provided power may be internal power, external power, or combination thereof.

Various embodiments described herein may be implemented in a computer-readable medium using, for example, software, hardware, or a combination.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in memory 160 and executed by controller 180.

Figure 2A:
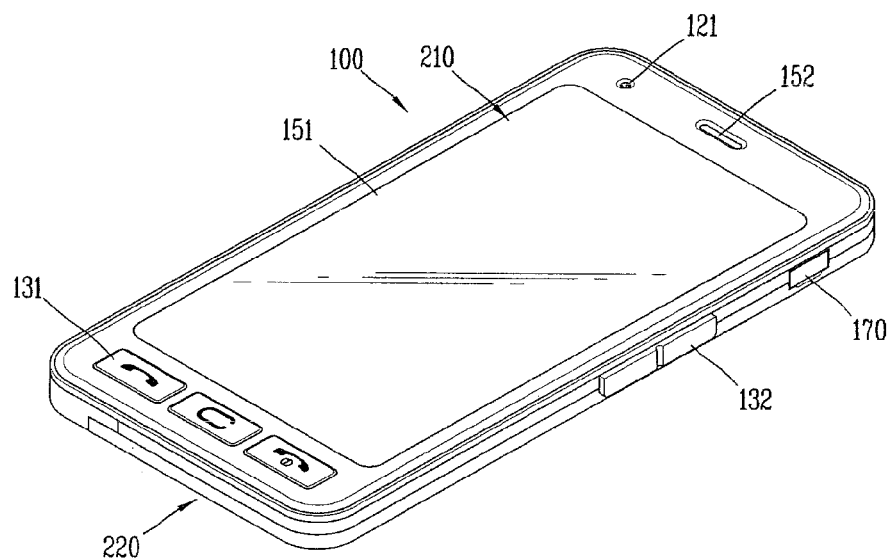
FIGS. 2A and 2B are diagrams showing front views of the mobile terminal.
Figure 2B:
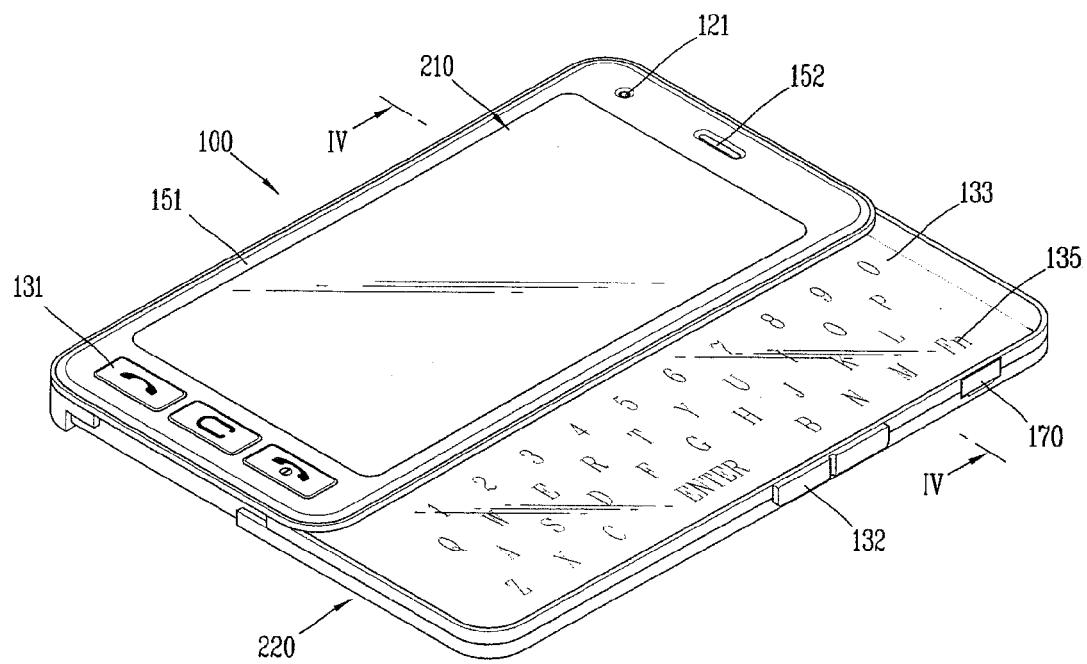

FIGS. 2A and 2B are front views of one embodiment of the mobile terminal. As illustrated in FIGS. 2A and 2B, mobile terminal 100 may include two bodies 210 and 220 slidably coupled to each other. Here, it is understood that the present embodiment may not be limited to this structure, but may be applicable to various structures including but not limited to a slide-type, folder-type, swing-type, or swivel-type and the like, each having two or more bodies coupled to be relatively slidable.

A terminal body forming an outer appearance of the mobile terminal 100 according to the one embodiment may include a main body 210 and a slider 220 slidably coupled to each other.

The figures show that the slider 220 is slidable in a widthwise direction of the math body 210, which allows a QWERTY type key arrangement of a transparent touch input unit 133 located on the slider 220. However, other embodiments may include a structure in which slider 220 is slidable in a lengthwise direction of the main body 210.

If the slider 220 is partially exposed to the front side, it may be referred to as an open configuration (FIG. 2B), and if the exposed part of the slider 220 is obscured by the main body 210, it may be referred to as a closed configuration (FIG. 2A).

Figure 4:
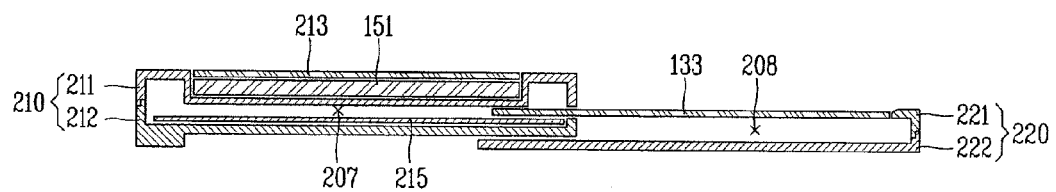
FIG. 4 is a diagram showing a sectional view of the mobile terminal.

The main body 210 and the slider 220 may be in a bar shape, respectively, so as to be overlaid each other. Also, as shown in FIG. 4 to be explained later, the main body 210 and the slider 220 may be formed having a section in a shape of '⊂', respectively, thus facing each other, resulting in implementation of a form factor capable of minimizing generation of a gap between a front surface of the main body 210 and a front surface of the slider 220 or a gap between a rear surface of the main body 210 and a rear surface of the slider 220.

The mobile terminal 100 normally operates in a standby or idle mode in the closed configuration, but the standby mode may be released by a user's manipulation. Also, the mobile terminal 100 operates in a phone call mode, an edition mode and the like in the open configuration, but may be converted into the standby mode by a user's manipulation or after a preset time elapses.

An outer appearance of the main body 210 may be formed by a plurality of cases (casings, covers, housings), and various electronic components may be mounted within an inner space of the cases. The cases may be formed by injection-molded synthetic resin, or may be formed using a metallic material such as stainless steel (STS) or titanium (Ti).

According to one embodiment, the main body 210 is shown having a display unit 151, an audio output module 152, a camera 121, a user input unit 131 and the like.

The display unit 151 may be implemented as a type of touch screen enabling touch-sensitive input of information. Here, the display unit 151 may have a size corresponding to a front face of the main body 210, and be configured to allow both input and output therethrough. As one example, the display unit 151 may output a soft key for executing a function of inputting numerals or characters or an iconized function, and a user can perform inputting by touching the soft key.

The user input unit 131 may be manipulated to receive commands for controlling operations of the mobile terminal 100, and, in the one embodiment, be implemented as a type of touch keys 131 disposed at the main body 210 for receiving commands responsive to a touch manipulation.

The slider 220 may be made of a transparent material. The transparent touch input unit 133 may be located on a front surface of the slider 220 externally exposed in the open configuration. The transparent touch input unit 133 may include a plurality of numbers, characters or symbols 135 (hereinafter, referred to as 'numbers and the like'). The numbers and the like may be printed or carved and configured to be distinguishable by lighting or illumination.

Push keys 132 as another exemplary type of the user input unit 130 may be disposed at a side surface of the slider 220. The push keys 132 may be implemented, for example, as dome switches so as to be pressed for inputting information.

Contents input via the user input unit 130 may be variously set. For instance, the touch keys 131 may be configured to input commands such as START, END, SCROLL or the like, and the transparent touch input unit 133 may be configured to input numbers and the like. Also, the push keys 132 may be configured to input commands, such as adjusting volume of sound output from the audio output module 152, conversion of the display unit 151 into a touch recognition mode and the like.

Figure 3:
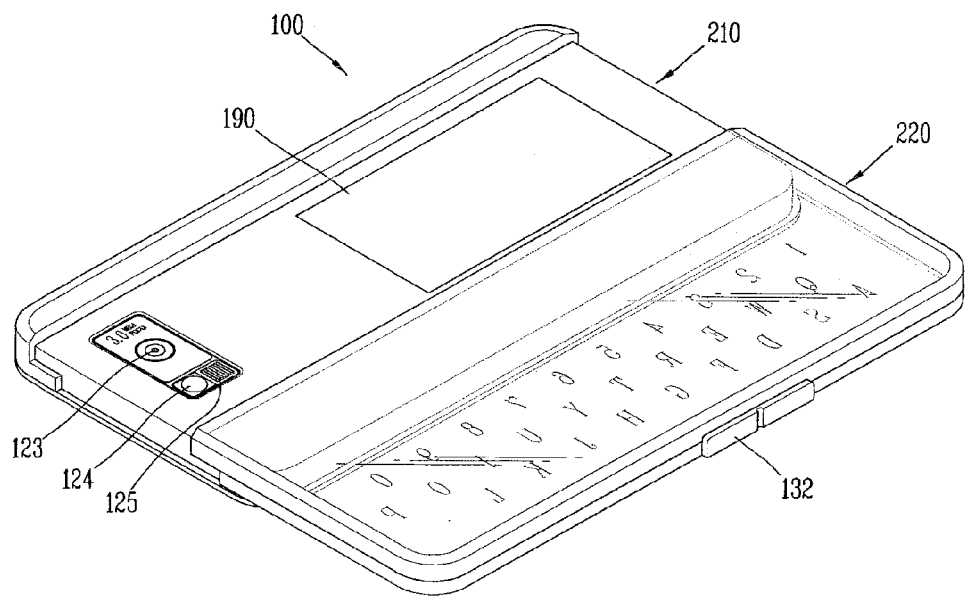
FIG. 3 is a diagram showing a rear view of the mobile terminal.

FIG. 3 is a rear view of the mobile terminal shown in FIG. 2B. As illustrated in FIG. 3, a rear surface of the may body 210 may further be provided with a camera 121'. The camera 121' faces a direction which is opposite to a direction faced by the camera 121 (see FIG. 2A), and may have different pixels from those of camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. Such cameras 121 and 121' may be installed in the terminal body to be rotatable or popped up.

A flash 123 and a mirror 124 may additionally be disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

The main body 210 may be provided with a power supply unit 190 for supplying power to the mobile terminal 100. The power supply unit 190 may be mounted within the terminal body as a type of battery, or detachably mounted outside the main body 210. If the battery 190 is detachably installed at the main body 210, a cover portion 222 (see FIG. 4) as a part of the slider 220 may be configured to be open for detachment and attachment of the battery 190.

FIG. 4 shows a sectional view of an open configuration of the mobile terminal. Here, slider 220 may include a slide portion 221 slidably coupled to the main body 210 so as to be slid into the main body 210 or slid out of the main body 210, and a cover portion 222 coupled to the slide portion 221 so as to be slidable along a rear surface of the main body 210. Here, at least one of the slide portion 221 and the cover portion 222 may be made of a transparent material. This embodiment illustrates that both of the slide portion 221 and the cover portion 222 are formed of a transparent material. In addition, a partial region (e.g., a side surface) of each of the slide portion 221 and the cover portion 222 may be made of a non-transparent material.

The main body 210 may include a front case 211 and a rear case 212 coupled to each other. The main body 210 may have therein a slide hole 207 in a sliding direction of the slide portion 221 such that the slide portion 221 may be retracted into the main body 210. Hence, the slide portion 221 may be accommodated in the slide hole 207 in the closed configuration, so as not to be viewed from the exterior.

The display unit 151, a main board 215 (e.g., a printed circuit board) and the like may be disposed within the main body 210. The display unit 151 and the main board 215 may partially be overlapped each other. For example, the display unit 151 and the main board 215 may be disposed to face each other by interposing the slide hole 207 therebetween.

A transparent window 213 may be disposed on a front surface of the display unit 151, and a touch sheet for detecting a touch input may be attached onto the window 213.

A transparent touch input unit 133 may be disposed on a front surface of the slide portion 221. An accommodation space 208 may be defined between the slide portion 221 and cover portion 222. Part of the main body 210 may be accommodated in the accommodation space 208 in the closed configuration. As shown in FIG. 4, the accommodation space 208 is empty in the open configuration, so an object located at an opposite side can be viewed through the transparent slide portion 221 and cover portion 222. Here, 'transparent' may include 'completely transparent' or 'semitransparent'.

The aforesaid shape and alignment of the main body 210 and the slider 220 can not only minimize a difference between the thickness of the main body 210 and the entire thickness of the mobile terminal 100 but also decrease the generation of the gap between the main body 210 and the slider 220 in the open configuration.

Figure 5:
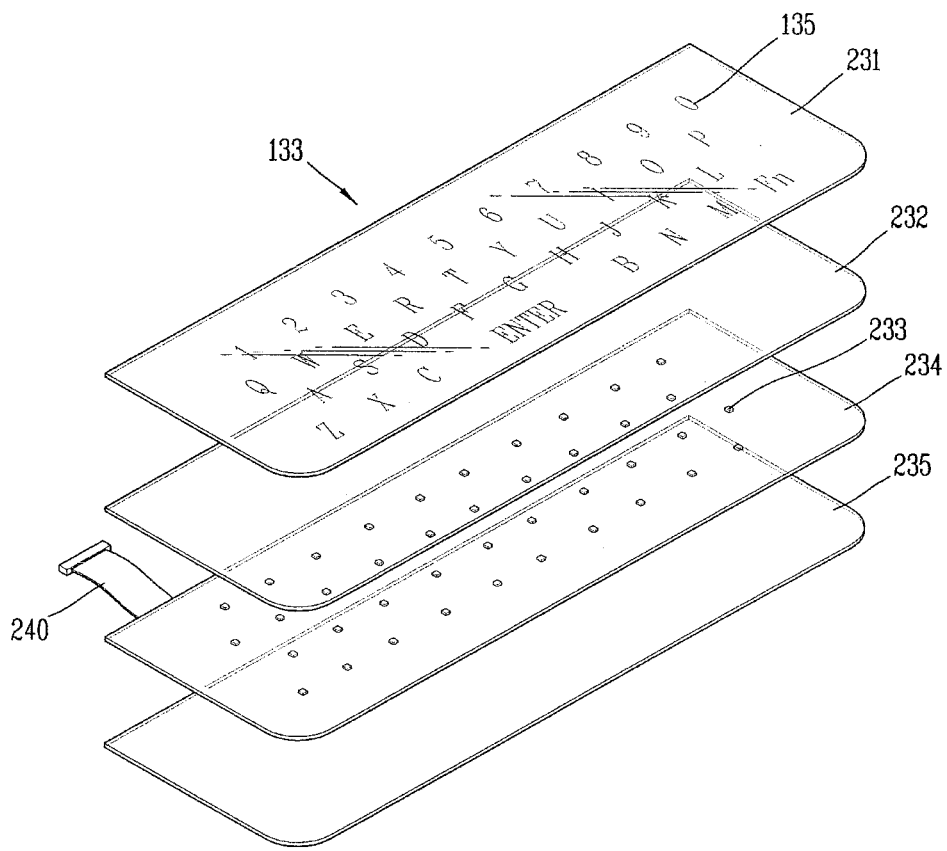
FIG. 5 is a diagram showing a disassembled view of a one possible touch input unit that may be used in accordance with the aforementioned embodiment.

FIG. 5 shows a disassembled view of one possible configuration of a touch input unit that may be used with the aforementioned embodiment. As shown in FIG. 5, the transparent touch input unit 133 may include a transparent keypad 231, a first transparent sheet 232, luminous elements 233 and a second transparent sheet 234. The components of the transparent touch input unit 133 may be adhered together by use of an adhesive or an adhesive sheet.

Figure 6:
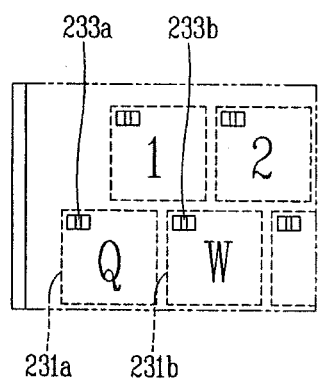
FIG. 6 is a diagram showing one possible arrangement of luminous elements that may be included in FIG. 5.

The transparent keypad 231 may be made of a transparent material and define a plurality of key regions thereon. The key regions denote spaces or areas allocated on the transparent keypad 231 for allowing inputting of information, such as numbers and the like, desired to be input. FIG. 6 exemplarily illustrates key regions 231a and 231b allocated for inputting 'Q' and 'W'.

Numbers and the like 135 may be represented on the key regions. The numbers and the like 135 may be printed on a front or rear surface of the transparent keypad 231, or imprinted or carved on a surface of the transparent keypad 231.

The first transparent sheet 232 may be located on one surface of the transparent keypad 231, and made of a transparent material. The one embodiment exemplarily illustrates the first transparent sheet 232 disposed at the rear surface of the transparent keypad 231.

The first transparent sheet 232 may be provided with a first conductive pattern which is also transparent. The first conductive pattern may serve to detect a touch input applied on the key regions 231a and 231b. The first conductive pattern may be formed of a transparent conductive material, for example, ITO, and configured on the first transparent sheet 232 to have a specific pattern. The first conductive pattern may generate an electrical signal when a user touches a key region of the transparent keypad 231 with his finger.

The luminous elements 233 may be disposed at rear sides of the key regions 231a and 231b, so as to respectively emit light to the corresponding key regions 231a and 231b. A light emitting diode (LED) may be used as luminous elements 233. A monochromic LED, an RGB LED and the like may be employed as the LED.

All of the luminous elements 233 may be turned on at the same time so as to individually emit light to the key regions 231a and 231b, or part of the luminous elements 233 may be selectively turned on so as to emit light to some of the key regions 231 and 231b. In addition, the luminous elements 233 may be combined while being turned on, thereby implementing various patterns, such as symbols, characters, numbers and the like.

FIG. 6 shows one possible alignment of luminous elements 233a and 233b. As shown in FIG. 6, the luminous elements 233a and 233b may be located at positions corresponding to the key regions 231a and 231b. FIG. 6 illustratively shows that the luminous elements 233a and 233b are disposed on regions where the numbers and the like 135, namely, 'Q' and 'W' are not present, for example, on upper portions of left side of the key regions 231a and 231b. Alternatively, in addition to the aforesaid configuration, the luminous elements 233a and 233b may be disposed to be overlaid on the numbers and the like 135, thus emitting light directly to the numbers and the like 135.

The second transparent sheet 234 may be disposed at a rear side of the transparent keypad 231 to support the luminous elements 233. The second transparent sheet 234 may be provided with second conductive patterns which are also transparent. The second conductive patterns may be connected to the luminous elements 233 so as to apply luminous signals to the luminous elements 233. The second conductive patterns may be patterned on the second transparent sheet 234 so as to be connected to the luminous elements 233, respectively, and also electrically connected to the controller 180 (see FIG. 1) so as to control operations of the luminous elements 233.

A flexible printed circuit board 240 may be connected to the first and second transparent sheets 232 and 234. The first and second conductive patterns formed respectively at the first and second transparent sheets 232 and 234 may accordingly be connected to the main board 215 via the flexible printed circuit board 240. Accordingly, the first and second conductive patterns can be connected to the controller 180 of the main board 215. The controller 180 may receive touch information relating to the first conductive pattern so as to operate other components (e.g., the display 151) based upon the received touch information, and apply luminous signals to the second conductive pattern to thereby operate the luminous elements 233.

Intermediate processing elements for processing the touch signal and the luminous signal may further be disposed between the controller 180 and the first and second conductive patterns.

The transparent supporting sheet 235 may further be attached onto the rear surface of the second transparent sheet 234. The supporting sheet 235 may support the first and second transparent sheets 232 and 234, and provide rigidity to the transparent touch input unit 133 for preventing the transparent touch input unit 133 from being bent or deformed.

Figure 7A:
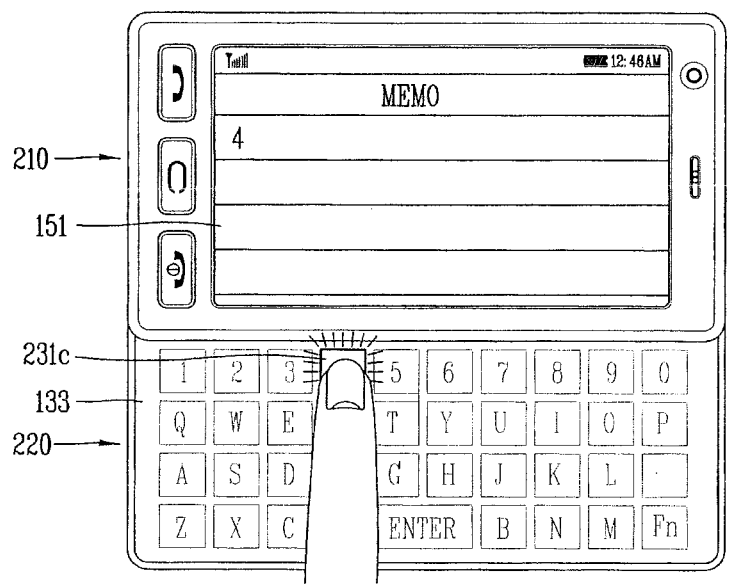
FIGS. 7A and 7B are diagrams showing various illustrative operating states of one embodiment that includes a transparent touch input unit.
Figure 7B:
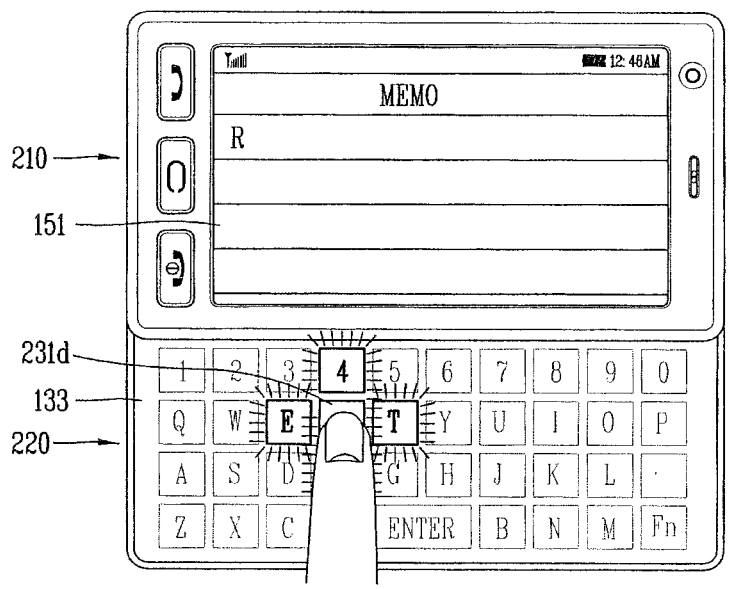

FIGS. 7A and 7B shows an example of different operating states that may be provided on transparent touch input unit in accordance with one embodiment. The controller 180 may be configured to operate the luminous elements 233 responsive to touch signals generated from the first conductive patterns of the first transparent sheet 232. For example, the controller 180, as shown in FIG. 7A, may operate a luminous element corresponding to a touched key region 231c. Accordingly, the touch key region 231c is illuminated by the corresponding luminous element, so that the user can identify the touched key region 231c.

Alternatively, as shown in FIG. 7B, the controller 180 may also operate luminous elements corresponding to adjacent regions of a touched key region 231d. FIG. 7B exemplarily illustrates that key regions located at upper, lower, right and left sides of the touch key region 231d are illuminated by luminous elements corresponding to the corresponding regions.

As such, the illumination effect implemented by the luminous elements upon a touch operation can be preset or selected by a user. Such configuration can allow the user to identify the touched key regions 231c and 231d and also provide various visual effects to the user. Besides, a configuration may also be available that when a touch input is given to a specific key region, at least two luminous elements of the luminous elements 233 may selectively emit light so as to cooperatively represent a specific pattern (e.g., character, number, symbol, etc.).

Figure 8A:
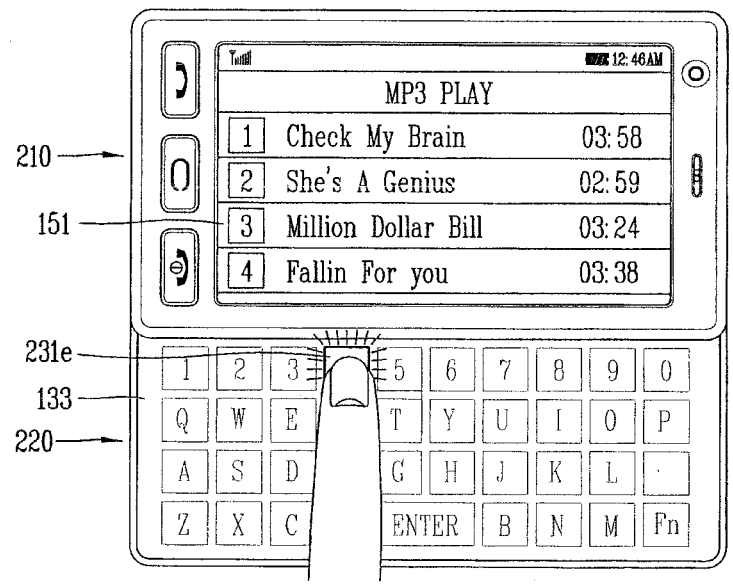
FIGS. 8A and 8B are diagrams showing various other operating states of an embodiment that includes a transparent touch input unit.
Figure 8B:
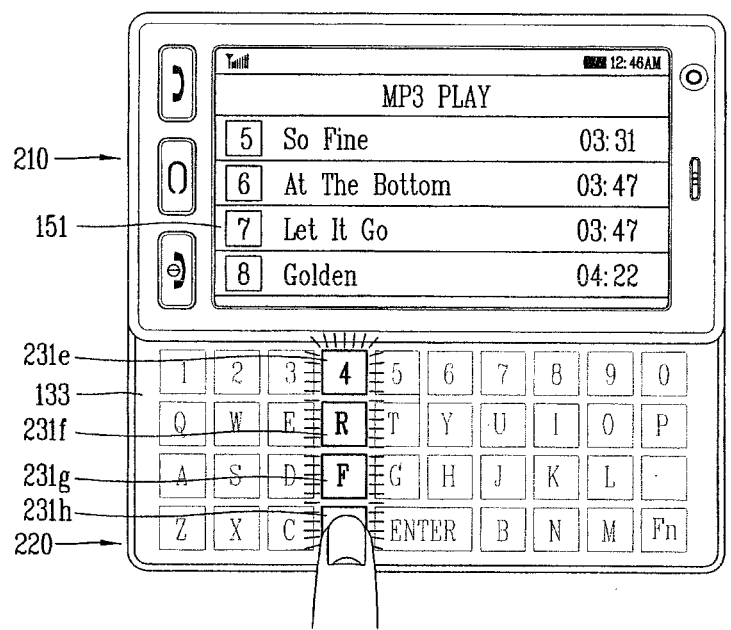

FIGS. 8A and 8B show examples of operating states of the transparent touch input unit in accordance with another embodiment. This embodiment also illustratively shows that the controller 180 controls the operations of the luminous elements 233 based upon touch signals generated from the first conductive patterns.

The first conductive pattern may be configured to detect a directional touch having at least one directionality. Here, 'directional touch' indicates a touch which is moved in at least one direction under a state where a user's finger or the like contacts a transparent keypad. Such directional touch may be referred to as a drag or the like.

The user may enter various information into the mobile terminal by virtue of the directional touch. For example, a user can move a pointer (or cursor) of a menu displayed on a display unit, directly move a screen, or input information in a writing manner.

The display unit 151 may display information corresponding to a directional touch as the directional touch is input onto the transparent keypad 231. For example, an output screen may be moved along the trace of the directional touch, or display an image (e.g., character, shape, etc.) corresponding to the trace of the directional touch.

As such the directional touch is input onto the transparent keypad 231, the controller 180 may sequentially operate the luminous elements 233 located on the trace of the directional touch. Consequently, the key regions 231e to 231h located on the trace of the directional touch may sequentially be illuminated.

FIGS. 8A and 8B show examples of moving of how a screen displayed on the display unit 151 may be moved or otherwise adjusted using a directional touch. As shown in FIG. 8A, a plurality of menus may be displayed on the display unit 151. Also, as shown in FIG. 8B, as a user downwardly inputs a directional touch on the transparent keypad 231, a screen is downwardly moved. Accordingly, menus having non-displayed on the screen can be visible.

Here, the key regions located on the trace of the directional touch input by the user may be sequentially illuminated. Hence, input of the directional touch can be identified by the user and simultaneously visual effect by the illumination can be achieved.

Figure 9:
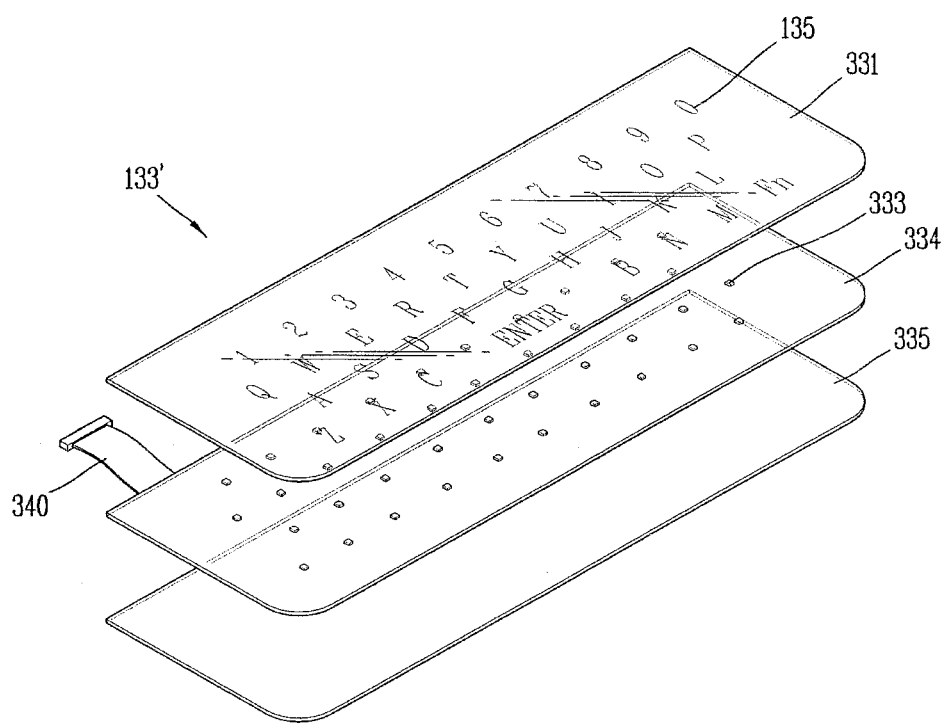
FIG. 9 is a diagram showing a disassembled view of another embodiment that includes a transparent touch input unit.
Figure 10:
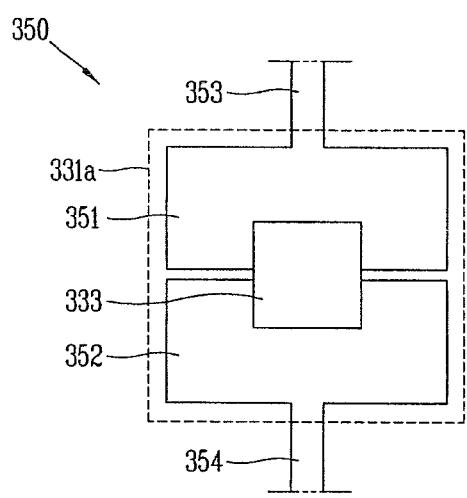
FIG. 10 is a diagram showing one possible type of conductive pattern that may be formed on a transparent sheet in FIG. 9.

FIG. 9 shows a disassembled view of a transparent touch input unit 133' in accordance with another embodiment, and FIG. 10 shows a conductive pattern formed on a transparent sheet in FIG. 9. The drawings may give similar reference numerals for the same or similar components to the previous embodiment.

The transparent touch input unit 133' may include a transparent keypad 331, luminous elements 333 and a transparent sheet 334 having conductive patterns. The transparent keypad 331 and the luminous elements 333 are configured in the same manner as those in the previous embodiment, description of which will thusly be omitted.

The transparent sheet 334 may be attached to a rear side of transparent keypad 331 for supporting the luminous elements 333. The transparent sheet 334 may be provided with transparent conductive patterns 350, as shown in FIG. 10. The conductive pattern 350 may serve to detect a touch input on a key region 331a and be electrically connected to the luminous element 333 to apply a luminous signal to the luminous element 333.

The conductive patterns 350 of the transparent sheet 334 may perform the functions of the first and second conductive patterns of the previous embodiment. Accordingly, the configuration corresponding to the first transparent sheet is not needed, thereby simplifying a fabricating process as well as further slimming the thickness of the transparent touch input unit 133'.

A flexible printed circuit board 340 may be connected to the transparent sheet 334, and accordingly the conductive patterns 350 may be connected to the main board 215 by virtue of the flexible printed circuit board 340. Consequently, the conductive patterns 350 may be connected to the controller 180 of the main board 215.

Intermediate processing elements for processing the touch signal and the luminous signal may further be disposed between the controller 180 and the conductive patterns 350. This embodiment exemplarily illustrates first and second interface units as examples of the intermediate processing elements (see FIG. 11).

Similar to the previous embodiment, a transparent supporting sheet 335 may be further attached onto the rear surface of the transparent sheet 334.

Referring to FIG. 10, each conductive pattern 350 may include first and second patterns 351 and 352 which are transparent, and transparent wires 353 and 354.

The first pattern 351 may have one end connected to one side of the luminous element 333 and be formed to occupy a partial area of the key region 331a. The second pattern 352 may have one end connected to another side of the luminous element 333 and be formed to occupy the other area of the key region 331a. That is, the first and second patterns 351 and 352 may define a touch region corresponding to the key region 331a.

The transparent wires 353 and 354 may be disposed at another ends of the first and second patterns 351 and 352, respectively, and electrically connected to the controller 180 for control of the luminous element 333. The transparent wires 353 and 354 may be electrically connected to the flexible printed circuit board 340 attached onto the transparent sheet 334.

The first and second patterns 351 and 352 may generate an electrical signal when a user's touch is input on the key region 351a of the transparent keypad 331. The electrical signal, namely, the touch signal may be then forwarded to the controller 180 via the transparent wires 353 and 354.

Furthermore, the luminous signal generated from the controller 180 may be delivered to the luminous element 333 via the transparent wires 353 and 354 and the first and second patterns 351 and 352. Here, one of the first and second patterns 351 and 352 may be connected to an anode of the luminous element 333 and another one connected to a cathode of the luminous element 333.

Figure 11:
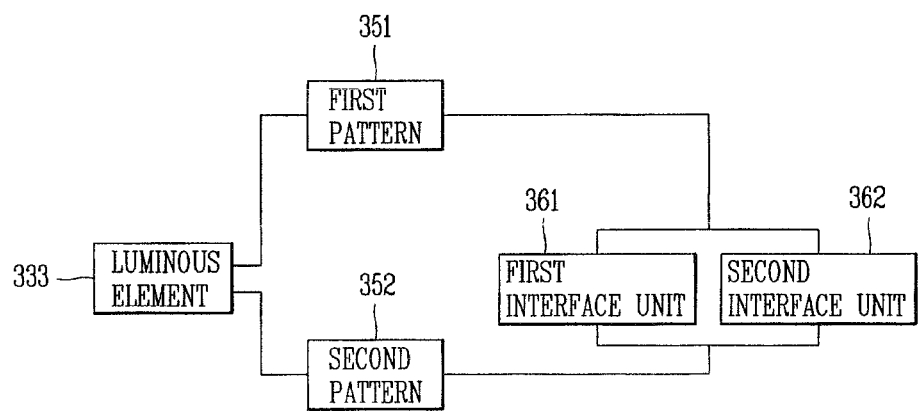
FIG. 11 is a diagram showing one possible configuration of a circuit relating to the conductive pattern in FIG. 10.

FIG. 11 shows one embodiment of a circuit relating to the conductive pattern shown in FIG. 10. As previously described, the intermediate processing elements for processing the touch signal and the luminous signal may further be disposed between the controller 180 and the conductive patterns 350. FIG. 11 also shows first and second interface units 361 and 362 as examples of the intermediate processing elements.

The first interface unit 361 may be connected to the first and second patterns 351 and 352, respectively, so as to process touch signals generated from the first and second patterns 351 and 352. That is, the first interface unit 361 may detect a touched region of a plurality of key regions and send such touch information to the controller 180.

The second interface unit 362 may be connected to the first and second patterns 351 and 352, respectively, so as to generate a signal for operating the luminous element 333. The second interface unit 362 may be connected to the controller 180 so as to control operations of the luminous elements 333 based upon a control signal of the controller 180.

The first and second interface units 361 and 362 may be connected in parallel to the first and second patterns 351 and 352, as shown in FIG. 11, thereby being connected to the controller 180, respectively.

The transparent touch input unit 133' may also be configured as shown in FIGS. 10 and 11 and the contents related to that described in FIGS. 7A and 7B and 8A and 8B may all be applied thereto. In addition, description has been given based upon the transparent touch input unit 133 and 133' being applied to a slide type terminal; however, the configuration and operations of the transparent touch input unit 133 and 133' may be applicable to various types of mobile terminals, such as a bar type, a folder type, a swing type and the like.

As described above, one or more embodiments described herein provide a touch-sensitive keypad formed of a transparent material, having a novel type of illumination structure different from the related art. In addition, these embodiments may employ an illumination structure of individually illuminating a plurality of key regions formed on a transparent touch-sensitive keypad, thereby more effectively emitting light to the key regions.

Also, in accordance with one or more embodiments, both conductive patterns for supplying signals to luminous elements and conductive patterns for detecting touch input may be provided, thereby slimming the thickness of the touch input unit and simplifying its fabricating process.

The mobile terminals described herein may include mobile phones, smart phones, laptop computers, digital broadcasting terminals, personal digital assistants (PDAs), portable multimedia players (PMPs), navigators, and the like.

In accordance with another embodiment, a mobile terminal comprises a transparent keypad having a plurality of key regions; a first transparent sheet having first conductive patterns to detect touch inputs on respective ones of the key regions; a plurality of luminous elements aligned with the key regions; and a second transparent sheet having second conductive patterns coupled to respective ones of the luminous elements, wherein the first and second conductive patterns are substantially transparent and wherein the second conductive patterns deliver signals to the luminous elements to light the key regions.

The transparent keypad, first transparent sheet, luminous elements, and second transparent sheet may be vertically arranged to form an input device. The input device may include an upper surface and a lower surface and wherein the input device is transparent from the upper surface to the lower surface.

In addition, the mobile terminal may include a slider to support the input device, wherein the slider moves between first and second positions and the input device is covered by a housing of the mobile terminal in the first position and the input device is exposed in the second position. The key regions may include at least one of characters, numbers or symbols, and the luminous elements may be located at positions that correspond to respective ones of the key regions.

In addition, the mobile terminal may include a controller to control operation of the luminous elements based upon touch signals generated from the first conductive patterns. The controller may be configured to operate luminous elements corresponding to touched key regions or to operate luminous elements corresponding to adjacent regions of a touch key region.

In accordance with another aspect, the first conductive patterns are configured to detect a directional touch having at least one directionality, and the controller sequentially operates the luminous elements located on a trace of the directional touch as the directional touch is input on the transparent keypad.

In addition, a display configured to output visual information, wherein the display displays information corresponding to the directional touch as the directional touch is input on the transparent keypad. The display moves an output screen along the trace of the directional touch or displays an image corresponding to the trace of the directional touch.

In accordance with another embodiment, a mobile terminal comprises a transparent keypad having a plurality of key regions; a plurality of luminous elements aligned with the key regions; a transparent sheet disposed adjacent the transparent keypad; and conductive patterns to detect touch inputs on respective ones of the key regions and to apply signals to respective ones of the luminous elements to light the key regions, wherein the conductive patterns are substantially transparent and wherein the luminous elements are coupled to the transparent sheet.

The conductive patterns and the luminous elements may be coupled to the transparent sheet. Also, the transparent keypad, the luminous elements, the conductive patterns, and the transparent sheet may be vertically arranged to form an input device. The input device may include an upper surface and a lower surface and wherein the input device is transparent from the upper surface to the lower surface.

In addition, the mobile terminal may include a slider to support the input device, wherein the slider moves between first and second positions, and the input device is covered by a housing of the mobile terminal in the first position and the input device is exposed in the second position.

In addition, the key regions may include at least one of characters, numbers or symbols, and the luminous elements are at positions corresponding to respective ones of the key regions.

Each of the conductive patterns may comprise a first pattern having one end coupled to one side of a corresponding luminous element and occupying a partial area of a corresponding key region; a second pattern, having one end coupled to another side of the corresponding luminous element, to form a touch region for the corresponding key region; and transparent wires coupled to other ends of the first and second patterns and to a controller for control of the luminous elements.

In addition, the mobile terminal may include a first interface circuit to process the touch signals, and a second interface circuit to generate the signals to be applied to the luminous elements, wherein the first and second interface circuits are respectively coupled to the first and second patterns in parallel. One of the first or second patterns may be coup led to an anode of a respective one of the luminous elements, and the other one of the first or second patterns may be coupled to a cathode of a respective one of the luminous elements.

The mobile terminal may also include a controller to control operations of the luminous elements based on touch signals generated from the conductive patterns. The controller is configured to operate luminous elements corresponding to touched key regions or to operate luminous elements corresponding to adjacent regions of a touch key region. The conductive patterns are to detect directional touches, each having at least one directionality, and the controller sequentially operates the luminous elements located on one or more traces of the directional touch as the directional touch is input on the transparent keypad.

In addition to another embodiment, a mobile terminal comprises a terminal body; and a transparent touch input unit coupled to the terminal body, wherein the transparent touch input unit comprises: (a) a transparent keypad having a plurality of key regions; (b) a first transparent sheet having first conductive patterns to detect touch inputs on respective ones of the key regions; (c) a plurality of luminous elements aligned with the key regions; and (d) a second transparent sheet having second conductive patterns coupled to respective ones of the luminous elements, wherein the first and second conductive patterns are substantially transparent and wherein the second conductive patterns deliver signals to the luminous elements to light the key regions.

The terminal body may include a main body having a wireless communication module; and a slider slidably coupled to the main body and the transparent touch input unit. The slider may include a slide portion slidably coupled to the main body and configured to be slid into the main body or slid out of the main body; and a cover coupled to the slide portion and slidable along a surface of the main body, wherein at least one of the slide portion or the cover portion is made of a transparent material.

The controller may be configured to control operations of the luminous elements based on touch signals generated from the first conductive patterns. In addition, the controller may be configured to operate luminous elements corresponding to touched key regions or to operate luminous elements corresponding to adjacent regions of a touch key region.

In accordance with another embodiment, a mobile terminal comprises a terminal body; and a transparent touch input unit coupled to the terminal body, wherein the transparent touch input unit comprises (a) a transparent keypad having a plurality of key regions; (b) a plurality of luminous elements aligned with the key regions; (c) a transparent sheet disposed adjacent the transparent keypad; and (d) conductive patterns to detect touch inputs on respective ones of the key regions and to apply signals to respective ones of the luminous elements to light the key regions, wherein the conductive patterns are substantially transparent and wherein the luminous elements are coupled to the transparent sheet.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Also, it is understood that all or part of each embodiment may be selectively combined with one or more features of the other embodiments to make various modifications thereto.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
    a terminal body including a front case and a rear case coupled to each other, and having a sliding hole, which extends in widthwise direction between the front case and the rear case; and
    a transparent slider coupled to the terminal body, and formed to move in the widthwise direction relative to the terminal body,
    wherein the transparent slider includes
    a transparent slide portion provided to slide along the sliding hole, and
    a cover portion coupled to the slide portion to slidably move with the transparent slide portion and configured to cover the rear case in a first position, the cover portion being formed to be transparent,
    wherein a luminous element that contacts the first and second conductive patterns, respectively, the luminous element being mounted on the transparent sheet and receives signals from the first and second conductive patterns to light the key region, and
    wherein the first conductive pattern is coplanar to the second conductive pattern, and one of the first and second conductive patterns is connected to an anode of the luminous element and another one is connected to a cathode of the luminous element,
    a transparent keypad having a plurality of key regions;
    a first transparent sheet having first conductive patterns to detect touch inputs on respective ones of the key regions;
    a plurality of luminous elements aligned with the key regions;
    a second transparent sheet having second conductive patterns coupled to respective ones of the luminous elements;
    a controller to control operation of the luminous elements based on touch signals generated from the first and second conductive patterns; and
    a display configured to output visual information,
    wherein the first and second conductive patterns are to detect directional touches, each of the directional touches having at least one directionality, and the controller sequentially operates a plurality of luminous elements located on one or more traces of a directional touch as the directional touch is input on the transparent keypad,
    wherein the display displays information corresponding to the directional touch as directional touch in input on the transparent keypad.

2. The mobile terminal of claim 1, wherein the transparent keypad, the luminous element, the conductive patterns, and the transparent sheet are vertically arranged to form an input device.

3. The mobile terminal of claim 2, wherein the input device includes an upper surface and a lower surface and wherein the input device is transparent from the upper surface to the lower surface.

4. The mobile terminal of claim 3, wherein the transparent slider moves between first and second positions, and the input device is covered by a housing of the mobile terminal in the first position and the input device is exposed in the second position.

5. The mobile terminal of claim 1, wherein: the key region includes at least one of characters, numbers or symbols, and the luminous element is positioned corresponding to the key region.

6. The mobile terminal of claim 5, wherein transparent wires are coupled to ends of the first and second conductive patterns and to a controller for control of the luminous element.

7. The mobile terminal of claim 6, further comprising: a first interface circuit to process the touch signals, and a second interface circuit to generate the signals to be applied to the luminous element, wherein the first and second interface circuits are respectively coupled to the first and second conductive patterns in parallel.

8. The mobile terminal of claim 6, wherein one of the first or second conductive patterns is coupled to an anode of the luminous element, and the other one of the first or second conductive patterns is coupled to a cathode of the luminous element.

9. The mobile terminal of claim 1, wherein the rear case includes a camera, and the cover portion covers the camera in the first position.

10. The mobile terminal of claim 1, wherein the display moves an output screen along the trace of the directional touch or displays an image corresponding to the trace of the directional touch.

11. The mobile terminal of claim 1, wherein the key regions include at least one of characters, numbers or symbols, and the luminous elements are at positions corresponding to respective ones of the key regions.

* * * * *